(12) United States Patent
Zhang et al.

(10) Patent No.: US 12,346,501 B2
(45) Date of Patent: Jul. 1, 2025

(54) HAPTIC FEEDBACK DEVICE, ELECTRONIC DEVICE, AND ROBOT SYSTEM

(71) Applicant: TENCENT TECHNOLOGY (SHENZHEN) COMPANY LIMITED, Shenzhen (CN)

(72) Inventors: Dongsheng Zhang, Shenzhen (CN); Lei Wei, Shenzhen (CN); Ke Chen, Shenzhen (CN); Qiang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 670 days.

(21) Appl. No.: 17/694,105

(22) Filed: Mar. 14, 2022

(65) Prior Publication Data

US 2022/0197391 A1    Jun. 23, 2022

Related U.S. Application Data

(63) Continuation of application No. PCT/CN2021/076823, filed on Feb. 19, 2021.

(30) Foreign Application Priority Data

Apr. 8, 2020    (CN) .......................... 202010268860.9

(51) Int. Cl.
*B25J 9/16* (2006.01)
*B25J 9/00* (2006.01)
(Continued)

(52) U.S. Cl.
CPC ............ *G06F 3/016* (2013.01); *B25J 9/0009* (2013.01); *B25J 9/0081* (2013.01); *B25J 9/1612* (2013.01); *B25J 13/025* (2013.01); *B25J 13/085* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 5,516,249 A | * | 5/1996 | Brimhall ............... | E02F 9/2008 703/3 |
| 6,042,555 A | * | 3/2000 | Kramer ................... | G06F 3/014 600/595 |

(Continued)

FOREIGN PATENT DOCUMENTS

| | | |
|---|---|---|
| CN | 101214428 A | 7/2008 |
| CN | 104842342 A | 8/2015 |

(Continued)

OTHER PUBLICATIONS

The State Intellectual Property Office of the People's Republic of China (SIPO) Office Action 1 for for 202010268860.9 Jan. 20, 2021 11 Pages (including translation).

(Continued)

*Primary Examiner* — Jonathan L Sample
(74) *Attorney, Agent, or Firm* — ANOVA LAW GROUP PLLC

(57) ABSTRACT

A haptic feedback device includes: a first feedback apparatus, including: a fixed platform, a movable platform, a ring disposed on the movable platform, and a power unit disposed on the fixed platform and connected to the movable platform. The power unit is configured to obtain a first control signal generated by a controller and output torsion according to the first control signal. The movable platform is configured to be driven by the torsion to move relative to the fixed platform. The ring is configured to provide feedback force as the movable platform moves, to implement haptic feedback.

19 Claims, 11 Drawing Sheets

(51) Int. Cl.
  *B25J 13/02*  (2006.01)
  *B25J 13/08*  (2006.01)
  *G06F 3/01*  (2006.01)

(56) References Cited

U.S. PATENT DOCUMENTS

| | | | | |
|---|---|---|---|---|
| 6,436,107 | B1* | 8/2002 | Wang | A61B 34/30 |
| | | | | 606/139 |
| 6,654,000 | B2* | 11/2003 | Rosenberg | G16H 50/50 |
| | | | | 434/262 |
| 6,697,044 | B2* | 2/2004 | Shahoian | G06F 3/016 |
| | | | | 345/156 |
| 8,881,616 | B2* | 11/2014 | Dize | G05G 9/047 |
| | | | | 345/161 |
| 8,918,214 | B2* | 12/2014 | Bosscher | B25J 9/1689 |
| | | | | 700/264 |
| 8,954,195 | B2* | 2/2015 | Summer | B25J 13/081 |
| | | | | 700/258 |
| 8,965,620 | B2* | 2/2015 | Bosscher | B25J 13/006 |
| | | | | 700/259 |
| 9,804,724 | B2 | 10/2017 | Colgate et al. | |
| 11,353,966 | B1* | 6/2022 | Ebert | G06T 19/006 |
| 2007/0112466 | A1* | 5/2007 | Ohnishi | G05B 19/19 |
| | | | | 700/260 |
| 2007/0236450 | A1* | 10/2007 | Colgate | G06F 3/041 |
| | | | | 345/156 |
| 2009/0102620 | A1* | 4/2009 | Kato | G06F 3/011 |
| | | | | 340/407.1 |
| 2009/0282331 | A1* | 11/2009 | Nagasaka | G06F 3/016 |
| | | | | 715/701 |
| 2010/0249675 | A1* | 9/2010 | Fujimoto | G06F 3/014 |
| | | | | 601/40 |
| 2011/0071664 | A1* | 3/2011 | Linn | B25J 9/0006 |
| | | | | 294/25 |
| 2012/0041595 | A1* | 2/2012 | Greeley | B25J 3/04 |
| | | | | 700/264 |
| 2012/0150349 | A1* | 6/2012 | Rust | B25J 9/1689 |
| | | | | 901/9 |
| 2012/0239195 | A1* | 9/2012 | Summer | B25J 5/005 |
| | | | | 901/46 |
| 2013/0046438 | A1* | 2/2013 | Summer | A61G 5/1051 |
| | | | | 701/1 |
| 2013/0173055 | A1* | 7/2013 | Kim | B25J 3/04 |
| | | | | 700/245 |
| 2013/0178978 | A1* | 7/2013 | Kim | B25J 9/00 |
| | | | | 700/251 |
| 2014/0116183 | A1* | 5/2014 | Smith | G06F 3/0338 |
| | | | | 74/490.12 |
| 2014/0135991 | A1* | 5/2014 | Summer | B25J 13/081 |
| | | | | 700/264 |
| 2014/0165770 | A1* | 6/2014 | Abri | B25J 13/025 |
| | | | | 606/130 |
| 2015/0290814 | A1* | 10/2015 | Schiele | G06F 3/016 |
| | | | | 74/491 |
| 2016/0259417 | A1* | 9/2016 | Gu | G06F 3/014 |
| 2017/0095298 | A1* | 4/2017 | Vakharia | A61B 18/1445 |
| 2017/0322629 | A1* | 11/2017 | Pirasmepulkul | G06F 3/0346 |
| 2018/0059787 | A1 | 3/2018 | Keller et al. | |
| 2018/0284760 | A1* | 10/2018 | Gupta | G06F 3/011 |
| 2018/0335842 | A1 | 11/2018 | Rubin et al. | |
| 2019/0041891 | A1* | 2/2019 | Parazynski | G05G 1/06 |
| 2019/0231459 | A1* | 8/2019 | Mustufa | A61B 34/25 |
| 2019/0258316 | A1* | 8/2019 | Suzuki | A61B 34/74 |
| 2019/0279524 | A1* | 9/2019 | Stoyanov | G06F 3/017 |
| 2019/0282309 | A1* | 9/2019 | Schaible | A61B 34/37 |
| 2019/0294249 | A1 | 9/2019 | Martin et al. | |
| 2019/0302887 | A1* | 10/2019 | Sinclair | G05G 5/03 |
| 2019/0324536 | A1* | 10/2019 | Forest | G06F 3/016 |
| 2020/0050269 | A1* | 2/2020 | Gu | B25J 9/0006 |
| 2020/0345553 | A1* | 11/2020 | Baudisch | G09B 21/003 |
| 2020/0375287 | A1* | 12/2020 | Ben-Tzvi | A61F 4/00 |
| 2020/0390510 | A1* | 12/2020 | Thompson | A61B 34/35 |
| 2021/0086364 | A1* | 3/2021 | Handa | B25J 13/08 |
| 2021/0278898 | A1* | 9/2021 | Erivantcev | G09G 3/32 |
| 2021/0393343 | A1* | 12/2021 | Sankai | G06F 3/0346 |
| 2022/0143826 | A1* | 5/2022 | Desai | B25J 9/1612 |
| 2022/0197391 | A1* | 6/2022 | Zhang | B25J 13/085 |

FOREIGN PATENT DOCUMENTS

| | | |
|---|---|---|
| CN | 109664278 A | 4/2019 |
| CN | 109746900 A | 5/2019 |
| CN | 109955284 A | 7/2019 |
| CN | 209679479 U | 11/2019 |
| CN | 111475025 A | 7/2020 |

OTHER PUBLICATIONS

The World Intellectual Property Organization (WIPO) International Search Report for PCT/CN2021/076823 May 25, 2021 5 Pages (including translation).

P.A. Millman et al., "Design of a Four Degree-Of-Freedom Force-Reflecting Manipulandum With a Specified Force/Torque Workspace," 1991 IEEE International Conference on Robotics and Automation, Apr. 1991. 6 pages.

3D System, Inc, "Haptic Devices," Retrieved from the Internet:URL: https://www.3dsystems.com/scanners-haptics#haptics-devices, retrieved on Mar. 14, 2022. 2 pages.

* cited by examiner

HAPTIC FEEDBACK DEVICE, ELECTRONIC DEVICE, AND ROBOT SYSTEM

CROSS-REFERENCES TO RELATED APPLICATIONS

This application is a continuation application of PCT Patent Application No. PCT/CN2021/076823, entitled "HAPTIC FEEDBACK DEVICE, ELECTRONIC DEVICE, AND ROBOT SYSTEM" and filed on Feb. 19, 2021, which claims priority to Chinese Patent Application No. 202010268860.9, entitled "HAPTIC FEEDBACK DEVICE, ELECTRONIC DEVICE, AND ROBOT SYSTEM" filed on Apr. 8, 2020, the entire contents of both of which are incorporated herein by reference.

FIELD OF THE TECHNOLOGY

The present disclosure relates to the field of electronic technologies, and specifically, to a haptic feedback technology.

BACKGROUND OF THE DISCLOSURE

A haptic feedback technology can reproduce tactile sensation for a user by a series of actions such as force, vibration and the like. The mechanical stimulus can be applied to auxiliary creation and control of virtual scenes or virtual objects in computer simulations, as well as strengthening remote control of machinery and devices.

With continuous advancement of science and technology, technologies such as virtual reality and augmented reality have made great breakthroughs. Vision-related technologies have been relatively mature. Combination of force sensing technology and visual technology can further enhance a sense of presence of the user. A haptic feedback device in a force sensing device not only enables the user to better interact with a virtual world, but also gives a more realistic sense of operation to the user who remotely controls a robot.

Currently, most of the haptic feedback devices are medium or large force feedback devices, which are mainly applied to upper limbs, lower limbs, hands, and the like. Haptic feedback devices applied to fingertips are relatively rare. In addition, operations at fingertips are relatively delicate, and a human hand has a relatively strong grip and high mobility, resulting in higher requirements on rigidity and dynamic performance of the feedback devices.

SUMMARY

To resolve the foregoing problem, technical solutions provided in the present disclosure are as follows:

A haptic feedback device includes: a first feedback apparatus, the first feedback apparatus including: a fixed platform, a movable platform, a ring disposed on the movable platform, and a power unit disposed on the fixed platform and connected to the movable platform. The power unit is configured to obtain a first control signal generated by a controller and output torsion according to the first control signal. The movable platform is configured to be driven by the torsion to move relative to the fixed platform. The ring is configured to provide feedback force as the movable platform moves, to implement haptic feedback. When the ring is moved by an external force, the power unit controls the ring to provide reaction force of the movement, so as to implement haptic feedback.

An electronic device includes: an interactive apparatus, an input/output (I/O) interface, a processor, and a memory, the memory storing a program instruction, the processor being configured to execute the program instruction stored in the memory; the interactive apparatus being configured to obtain an operation instruction inputted by a user, the interactive apparatus including the haptic feedback device. The haptic feedback device includes a first feedback apparatus, the first feedback apparatus including: a fixed platform, a movable platform, a ring disposed on the movable platform, and a power unit disposed on the fixed platform and connected to the movable platform. The power unit is configured to obtain a first control signal generated by the processor and output torsion according to the first control signal. The movable platform is configured to be driven by the torsion to move relative to the fixed platform. The ring is configured to provide feedback force as the movable platform moves, to implement haptic feedback.

A robot system includes: an operating apparatus, a processor, an input/output (I/O) interface, a memory, and a mechanical arm, the mechanical arm and the operating apparatus being respectively connected to the memory and the processor through the input/output (I/O) interface, the operating apparatus being configured to control movement of the mechanical arm; and the operating apparatus being configured to obtain an operation instruction inputted by a user, the operating apparatus including the haptic feedback device. The haptic feedback device includes a first feedback apparatus, the first feedback apparatus including: a fixed platform, a movable platform, a ring disposed on the movable platform, and a power unit disposed on the fixed platform and connected to the movable platform. The power unit is configured to obtain a first control signal generated by the processor and output torsion according to the first control signal. The movable platform is configured to be driven by the torsion to move relative to the fixed platform. The ring is configured to provide feedback force as the movable platform moves, to implement haptic feedback.

The haptic feedback device provided in the present disclosure includes: a first feedback apparatus, including: a fixed platform, a power unit, a movable platform and a ring. The power unit is set on the fixed platform, the movable platform is connected to the power unit, and the ring is set on the movable platform; the power unit drives the movable platform to move relative to the fixed platform, to control movement of the ring; when the ring is moved by external force, the power unit controls the ring to provide reaction force of the movement, so as to implement haptic feedback. During specific operation, a user inserts a finger into the ring, and the power unit drives the movable platform to move relative to the fixed platform. Therefore, the device can provide accurate force feedback to the finger of the user through the ring, achieving good rigidity and dynamic performance.

BRIEF DESCRIPTION OF THE DRAWINGS

To describe the technical solutions in the embodiments of the present disclosure or in the related art more clearly, the following briefly describes the accompanying drawings required for describing the embodiments or the related art. Apparently, the accompanying drawings in the following descriptions show merely the embodiments of the present disclosure, and a person of ordinary skill in the art may still derive other drawings from the accompanying drawings without creative efforts.

DESCRIPTION OF EMBODIMENTS

Figure 1:
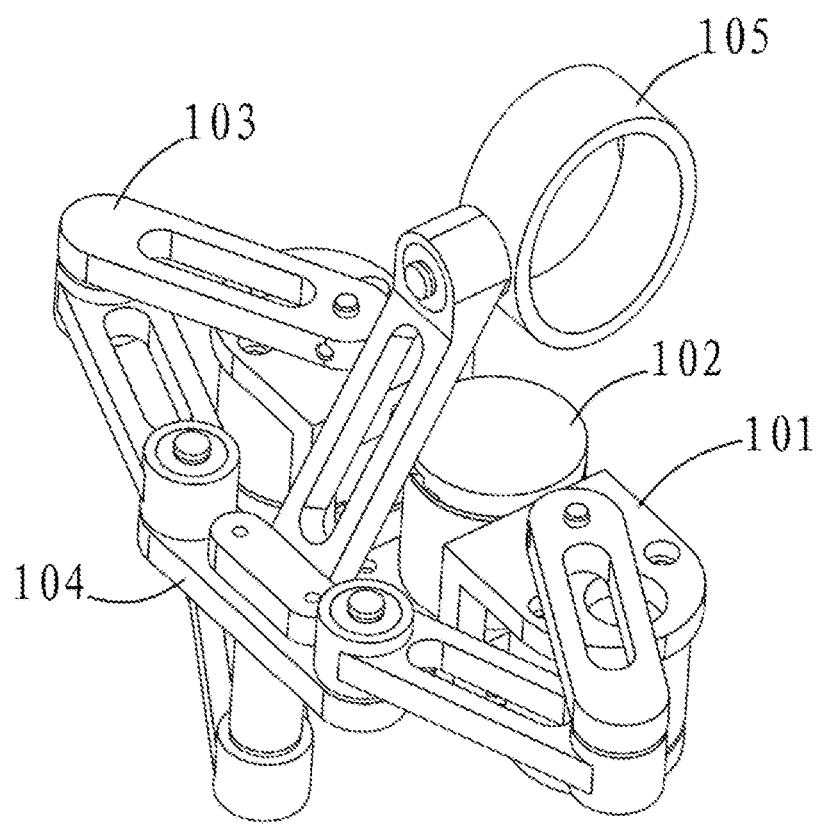
FIG. 1A is a schematic diagram of an embodiment of a haptic feedback device according to an embodiment of the present disclosure.
FIG. 1B is a schematic diagram of a usage scenario of a haptic feedback device according to an embodiment of the present disclosure.

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The terms such as "first", "second", "third", and "fourth" (if any) in the specification and claims of the present disclosure and in the accompanying drawings are used for distinguishing between similar objects and not necessarily used for describing any particular order or sequence. It is to be understood that the data used in such a way is interchangeable in proper cases, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

A haptic feedback technology can reproduce tactile sensation for a user by a series of actions such as force, vibration and the like. The mechanical stimulus can be applied to auxiliary creation and control of virtual scenes or virtual objects in computer simulations, as well as strengthening remote control of machinery and devices.

With continuous advancement of science and technology, technologies such as virtual reality and augmented reality have made great breakthroughs. Vision-related technologies have been relatively mature. Combination of force sensing technology and visual technology can further enhance a sense of presence of the user. A haptic feedback device in a force sensing device not only enables the user to better interact with a virtual world, but also gives a more realistic sense of operation to the user who remotely controls a robot.

Currently, most of the haptic feedback devices are medium or large force feedback devices, which are mainly applied to upper limbs, lower limbs, hands, and the like. Haptic feedback devices applied to fingertips are relatively rare. In addition, operations at fingertips are relatively delicate, and a human hand has a relatively strong grip and high mobility, resulting in higher requirements on rigidity and dynamic performance of the feedback devices.

In order to solve the foregoing problem, the embodiments of the present disclosure provide a haptic feedback device that can use a power unit installed on a fixed platform to drive a movable platform to move through transmission by a transmission unit, thereby outputting power for a ring on the movable platform, implementing force feedback for a finger, and achieving good rigidity and dynamic performance.

The method provided in the embodiments of the present disclosure may be applied to a variety of usage scenarios, for example, a human-computer interaction gamepad in virtual reality (VR), or feedback of operating force in a remote or virtual world being timely transmitted to a finger of a user, thereby enhancing a sense of force presence of an operator. This is not limited in the embodiments of the present disclosure.

Further, the device provided in the embodiments of the present disclosure may further be applied to the field of artificial intelligence (AI). The AI is a theory, method, technology and application system that uses digital computers or machines controlled by digital computers to simulate, extend and expand human intelligence, perceive the environment, acquire knowledge, and use knowledge to obtain the best results. The AI technology is a comprehensive discipline, covering a wide range of fields, including both hardware-level technology and software-level technology. The operation/interaction system is one of the basic technologies of AI. A haptic feedback device provided in the embodiments of the present disclosure can be applied to human-computer interaction of an AI system. The AI is to study design principles and implementation methods of various intelligent machines, to enable the machines to have functions of perception, reasoning, and decision-making. Therefore, a machine can automatically generate a force feedback decision through the AI, and transmit the feedback to a user through the haptic feedback device provided in the embodiments of the present disclosure, so that the AI system can interact with the user at a hardware level.

The following describes the haptic feedback device provided in the embodiments of the present disclosure in detail with reference to the accompanying drawings.

As shown in FIG. 1A, the haptic feedback device provided in the embodiments of the present disclosure includes:

a first feedback apparatus, including: a fixed platform 101, a power unit 102, a transmission apparatus 103, a movable platform 104 and a ring 105. The power unit 102 is set on the fixed platform 101, the movable platform 104 is connected to the power unit 102 through the transmission apparatus 103, and the ring 105 is set on the movable platform 104; the power unit 102 drives the movable platform 104 to move relative to the fixed platform 101 through the transmission apparatus 103, to control movement of the ring 105; when the ring 105 is moved by external force, the power unit 102 controls the ring 105 to provide reaction force of the movement, so as to implement haptic feedback.

In a specific working process, a user inserts a finger into the ring 105. When the finger of the user drives the ring 105 to move, the power unit 102 provides reaction force to the ring 105 according to the foregoing manner, so that the finger of the user feels feedback force through the ring 105, thereby implementing an effect of the haptic feedback. Specifically, when the finger of the user drives the ring 105 to move, the movement of the ring 105 is transmitted to the power unit 102 through the transmission apparatus 103, so that the power unit 102 can sense the movement of the finger of the user, and then outputs power according to a preset program, to provide the foregoing reaction force. The preset program may be any program in the related art, for example, in a remote operation scenario, a feedback force parameter generated by a remote actual operation scenario, or a feedback force parameter generated by a game program in a virtual game, or a feedback force parameter generated by AI in an AI scenario, which is not limited in the embodiments of the present disclosure.

For example, a user plays a game in a virtual world, and uses the haptic feedback device provided in the embodiments of the present disclosure to perform human-computer interaction. During the game, a target unit needs to be dragged by a finger to finish a game task. The user inserts an index finger into the ring 105, and drags the ring 105 towards direction X1. At this time, the haptic feedback device senses the moving direction of the ring 105, and applies resistance towards direction X2 by the foregoing method, the direction X2 being an opposite direction of the direction X1. Therefore, the user can feel the resistance in the process of dragging the ring 105, which simulates resistance generated in a process of dragging an object in a real world, thereby enhancing a sense of force presence of the user.

In some embodiments, the first feedback apparatus may not include the transmission apparatus 103. Specifically, the power unit 102 and the movable platform 104 may implement force transmission without an independent transmission apparatus 103. For example, when the power unit 102 has gears and the movable platform 104 also has gears, the movable platform 104 and the power unit 102 are connected by gear meshing, and the force transmission is implemented by meshing transmission.

Further, in order to sense a value of the force with which the user drags the ring, a first sensor is set on an inner side of the ring. When the first sensor senses external force, the first sensor obtains a value of the external force and transmits the value to a controller, to enable the controller to generate a first control signal according to the value of the external force. In some embodiments, the controller may be a processor.

In this embodiment, the controller may include configurations running a VR game. According to the value of the external force inputted by the first sensor, the value of the force inputted by the user through the haptic feedback device can be determined. The controller generates the first control signal according to control logic of the VR game, to control the power unit to provide the force feedback to the finger of the user through the ring.

Moreover, the controller may connect to a gripping apparatus. The haptic feedback device remotely controls, through the controller, the gripping apparatus to grip an object. The gripping apparatus includes two hooks connected in a hinged manner. The two hooks move close to each other to grip the object. Since the gripping apparatus may be any gripping apparatus in the related art, a specific structure of the gripping apparatus is not described again in the embodiments of the present disclosure. A second sensor is set on an inner side of at least one of the hooks of the gripping apparatus, and the second sensor is configured to obtain a pressure value during a gripping process of the gripping apparatus.

The controller is configured to generate a second control signal according to the value of the external force (that is, the value of dragging force with which the user drags the ring after inserting the finger to the ring) obtained by the first sensor. The second control signal is used for controlling gripping force of the gripping apparatus.

The controller is further configured to generate the first control signal according to the pressure value (that is, the value of pressure with which the gripping apparatus squeezes the object when gripping the object) obtained by the second sensor.

Figure 1B:
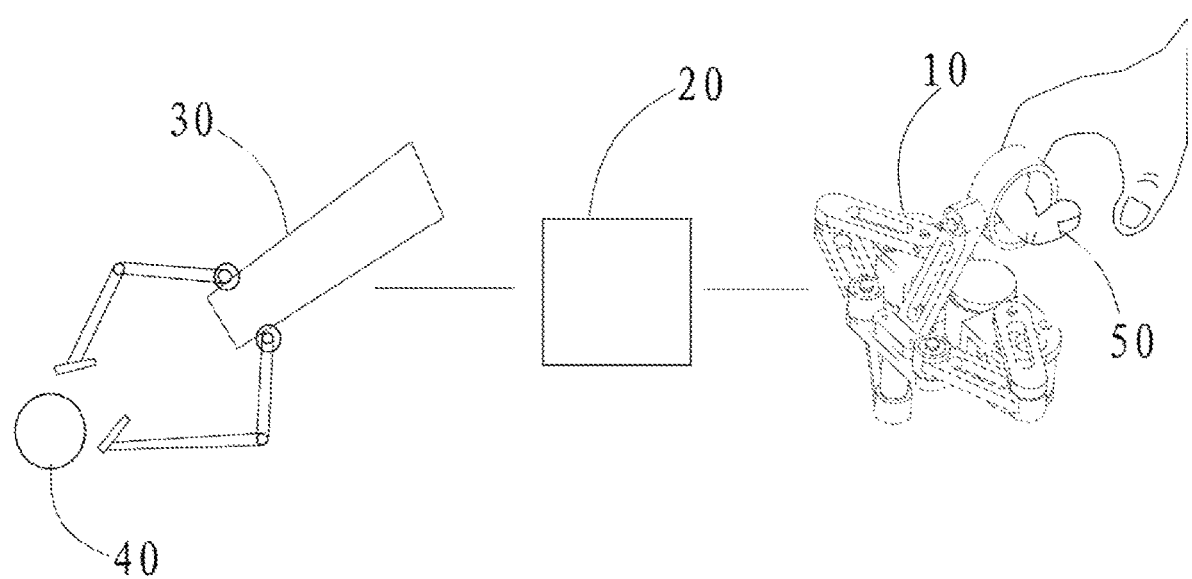

In a specific working process, as shown in FIG. 1B, the haptic feedback apparatus 10 in FIG. 1B has the same structure as that in FIG. 1A. When the ring moves under traction of the finger 50 of the user, the first sensor obtains the value of the external force and transmits the value to the controller 20. The controller 20 generates the second control signal according to the value of the external force and transmits the signal to a remote gripping apparatus 30. The gripping apparatus 30 outputs gripping force according to the second control signal and grips a target object 40. The second sensor obtains the value of pressure with which the gripping apparatus 30 grips the target object 40 and transmits the value to the controller 20. The controller 20 generates the first control signal according to the pressure value and transmits the signal to the power unit of the haptic feedback device. The power unit outputs torsion according to the first control signal, to provide feedback force on the ring.

In the foregoing process, the user remotely controls, through the haptic feedback device, the gripping apparatus to grip the target object. At the same time, the user feels, according to the haptic feedback device, the force feedback of the gripping apparatus when gripping the target object, so that a remote gripping operation has a sense of force presence, and the user has a feeling of directly controlling the gripping apparatus to grip the target object.

In this embodiment, the provided haptic feedback apparatus includes two platforms: the fixed platform and the movable platform. The fixed platform is fixed. The movable platform is controlled to move relative to the fixed platform through the power unit and the transmission apparatus, so that an overall structure of the apparatus is relatively compact with good rigidity. The ring is set on the movable platform. In some embodiments, the ring can rotate relative to the movable platform, so that movement of the ring can be flexibly controlled, and force feedback with different values and different directions can be provided according to movement of a finger, thereby achieving good dynamic performance. Therefore, a suitable haptic feedback device is provided for delicate and flexible joints of the finger of the user.

In the haptic feedback device provided by the embodiment of the present disclosure, there may be more than one feedback apparatus. When the feedback apparatus only includes the first feedback apparatus, the haptic feedback can be provided to one finger of the user. When a plurality of feedback apparatuses are provided, the haptic feedback can be provided to a plurality of fingers of the user. For example, the haptic feedback device includes two symmetrically set apparatuses, which are the first feedback apparatus and the second feedback apparatus. A ring of the first feedback apparatus is configured to provide force feedback to an index finger of the user, and a ring of the second feedback apparatus is configured to provide force feedback to a thumb of the user. Therefore, in a specific working process, the two feedback apparatuses can adapt to posture changes in a relative movement process of the thumb and the index finger, and provide a force feedback effect when the user performs actions such as pinching and rubbing with the index finger and the thumb. For ease of understanding, such a case is described in detail below with reference to the accompanying drawings.

Figure 2:
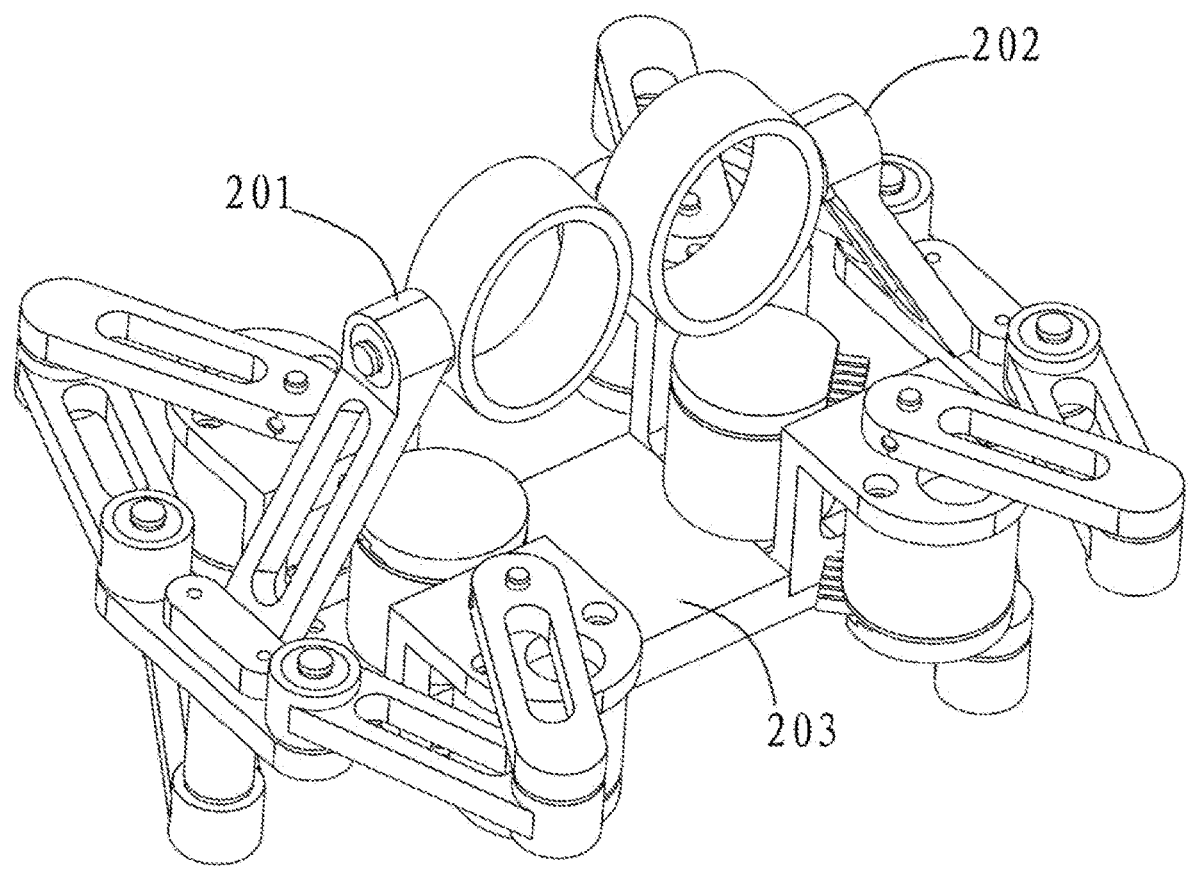
FIG. 2 is a schematic diagram of another embodiment of a haptic feedback device according to an embodiment of the present disclosure.

As shown in FIG. 2, the haptic feedback device includes a first feedback apparatus 201, a second feedback apparatus 202, and a connecting piece 203. The first feedback apparatus 201 and the second feedback apparatus 202 have the same structure. The specific structure is shown in FIG. 1A, and details are not described herein again. The first feedback apparatus 201 is connected to the connecting piece 203 through a fixed platform of the first feedback apparatus 201, and the second feedback apparatus 202 is also connected to the connecting piece 203 through a fixed platform of the second feedback apparatus 202. The first feedback apparatus 201 and the second feedback apparatus 202 are symmetrically set at two ends of the connecting piece 203.

In this embodiment, as shown in FIG. 2, the two feedback apparatuses are symmetrically set at the two ends of the connecting piece. The user inserts two fingers into rings of the two feedback apparatuses respectively, to implement force feedback to the fingers. For example, when inserting the thumb and the index finger to the rings respectively, the user can feel haptic feedback when performing actions such as pinching and rubbing, thereby implementing a sense of force presence of the operation.

In the embodiments provided in the present disclosure, the quantity of feedback apparatuses in the haptic feedback device is not limited. For example, one feedback apparatus can be configured to implement force feedback to a single finger, or five feedback apparatuses can be configured to implement force feedback to five fingers, or even more feedback apparatuses are configured to implement force feedback under other usage requirements. The quantity of feedback apparatuses can be selected according to actual needs, which is not limited in the embodiments of the present disclosure.

Further, when more than one feedback apparatus is provided, each feedback apparatus may have a different structure. For example, each feedback apparatus may be implemented in any one of manners in the following embodiments. The following describes a specific structure of the feedback apparatus in the haptic feedback device in detail.

Figure 3:
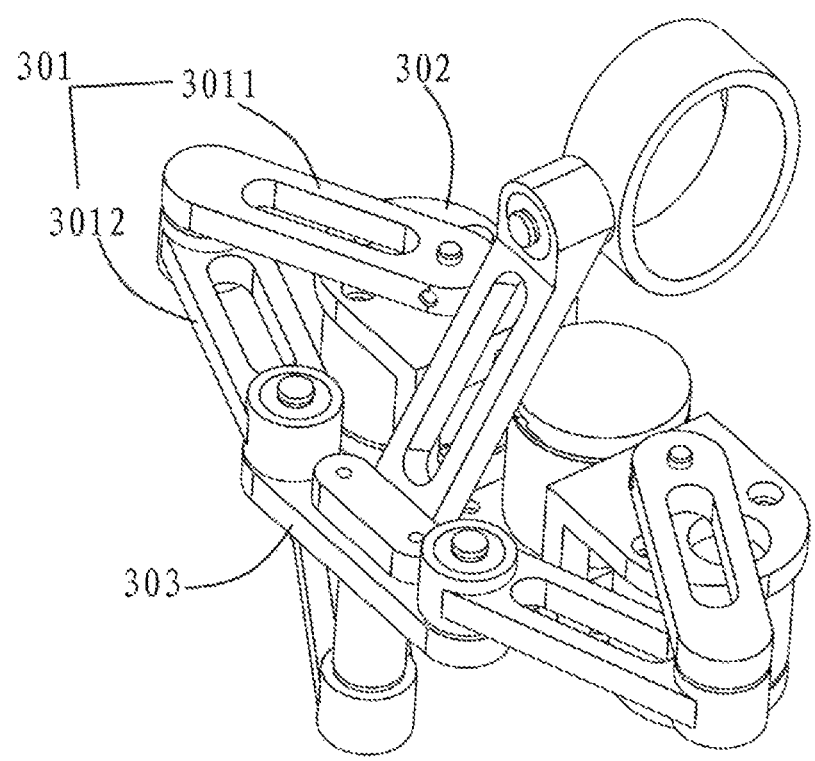
FIG. 3 is a schematic diagram of another embodiment of a haptic feedback device according to an embodiment of the present disclosure.

As shown in FIG. 3, the transmission apparatus in FIG. 1A described above specifically includes the following structures.

The transmission apparatus 301 includes a first link 3011 and a second link 3012. The first link 3011 is connected to a power output terminal of the power unit 302, the second link 3012 is connected to the movable platform 303, and the first link 3011 is connected to the second link 3012 in a hinged manner; the power unit 302 drives the movable platform 303 through the first link 3011 and the second link 3012. A link, as used herein, may refer to a connecting rod or a connecting bar.

In a specific working process, in some embodiments, the power unit 302 may be a motor. When the motor outputs power, an output terminal of the motor drives the first link 3011 to rotate, and the first link 3011 is connected to the second link 3012 in a hinged manner, so that rotation of the first link 3011 can drive rotation of the second link 3012. The second link 3012 is connected to the movable platform 303, so that the rotation of the second link 3012 can drive the movable platform 303 to move, thereby finally implementing power transmission of the transmission apparatus 301 between the power unit 302 and the movable platform 303.

In this embodiment, the transmission apparatus is implemented by a structure formed by two links connected to each other in a hinged manner. First, a linkage structure can have higher flexibility, so that the transmission unit can implement dynamic performance required for haptic feedback to the finger. Further, the linkage structure can be formed by hard links connected to each other in a hinged manner, achieving higher rigidity. Finally, when the power unit includes a plurality of motors, the transmission apparatus can work with a plurality of links being connected in parallel, so that the structure is more compact and take up less space.

Figure 4:
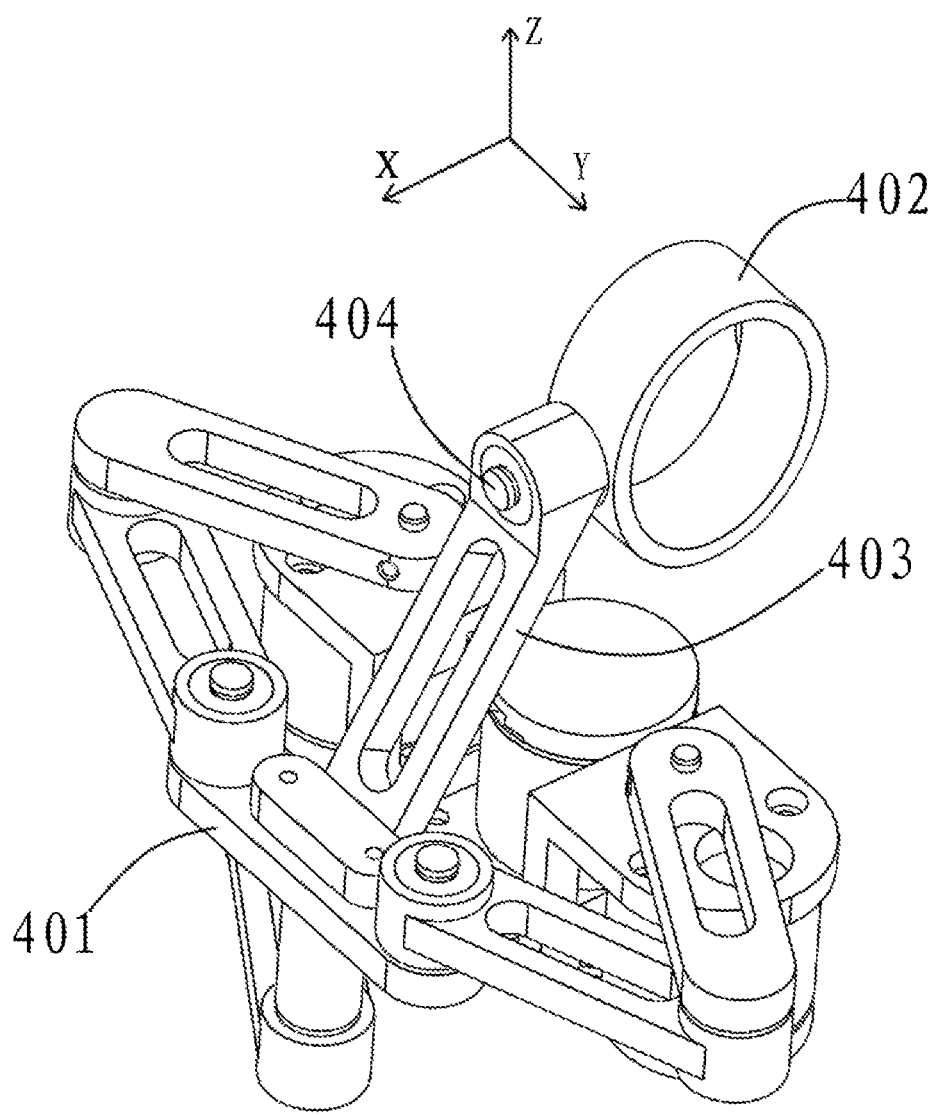
FIG. 4 is a schematic diagram of another embodiment of a haptic feedback device according to an embodiment of the present disclosure.

Further, with reference to FIG. 4, according to the haptic feedback device provided in the embodiments of the present disclosure, a connection method between the movable platform and the ring is shown in FIG. 4.

The movable platform 401 and the ring 402 are connected through a third link 403. An end of the third link 403 is fixedly connected to the movable platform 401, and another end of the third link 403 is connected to the ring 402 through a rotating shaft 404, so that the ring 402 can rotate around the rotating shaft 404.

Figure 5:
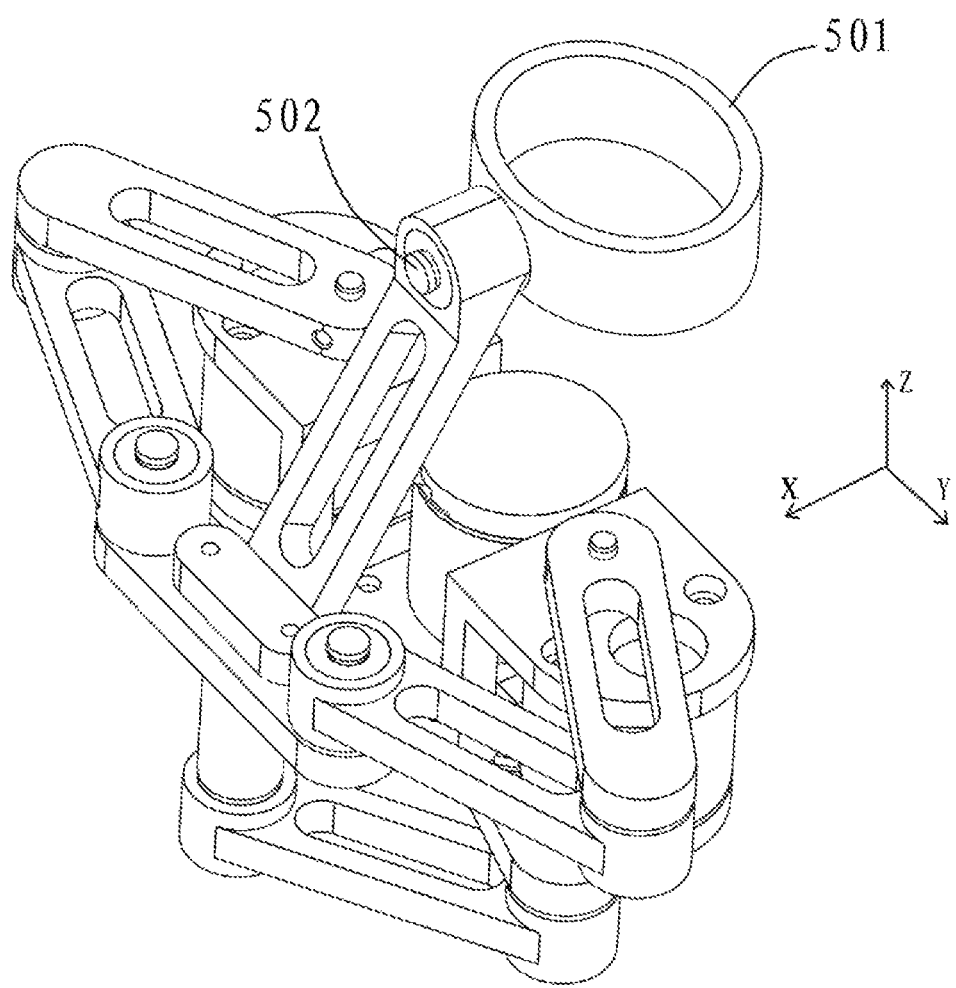
FIG. 5 is a schematic diagram of another embodiment of a haptic feedback device according to an embodiment of the present disclosure.

In a specific implementing process, the end of the third link 403 is fixedly connected to the movable platform 401, so that movement of the movable platform 401 can be completely transmitted to the third link 403, to ensure that movement of the third link 403 can be synchronized with the movement of the movable platform 401. Further, the other end of the third link 403 is connected to the ring through the rotating shaft 404. FIG. 4 shows three directions: x, y, and z, where the rotating shaft 404 may be parallel to plane xy, so that the ring 402 can rotate around the rotating shaft 404. FIG. 5 shows an effect of the ring 501 after rotating. The ring 501 rotates by 90° around a rotating shaft 502 relative to the position in the FIG. 4. In some embodiments, according to actual needs, the connection between the ring and the third link may further be implemented through other possible methods, which are not limited in the embodiments of the present disclosure.

In this embodiment, the ring is driven by the third link to keep moving in synchronization with the movable platform, so that the ring can provide the force feedback to the user according to driving of the power unit. Further, because the ring can rotate freely around the third link, in the working process, the haptic feedback device can provide the user with the force feedback more similar to an actual situation.

In the haptic feedback device provided in the embodiments of the present disclosure, the power unit can be implemented by a motor, where the power unit can include a set of motors or a plurality of motors. Each set of motors can provide a degree of freedom for the haptic feedback device. Therefore, more motors can provide more degrees of freedom for the device. However, correspondingly, as the quantity of motors increases, the quantity of transmission apparatuses will also increase, thus increasing the volume of the entire device, and increasing redundancy of outputted degrees of freedom. The haptic feedback device provided in the embodiments of the present disclosure is mainly used for fingers of a user, and requires a relatively compact volume. Therefore, a balance between the degrees of freedom and the volume needs to be achieved. In a preferred implementation, the embodiments of the present disclosure provide a parallel feedback apparatus having three degrees of freedom. For ease of understanding, the following describes the preferred implementations of the haptic feedback device provided in the embodiments of the present disclosure in detail.

Figure 6A:
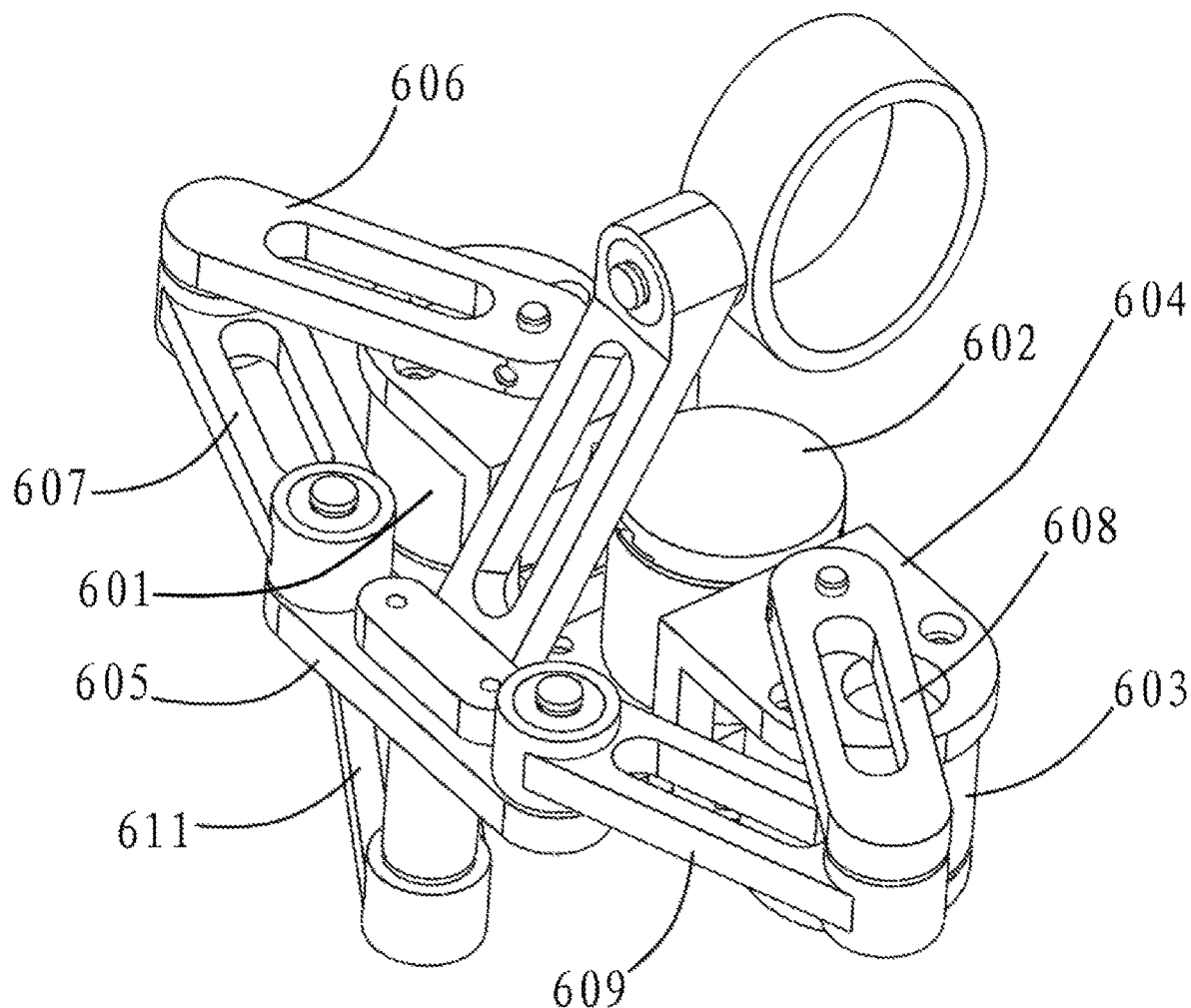
FIG. 6A is a schematic diagram of another embodiment of a haptic feedback device according to an embodiment of the present disclosure.
Figure 6B:
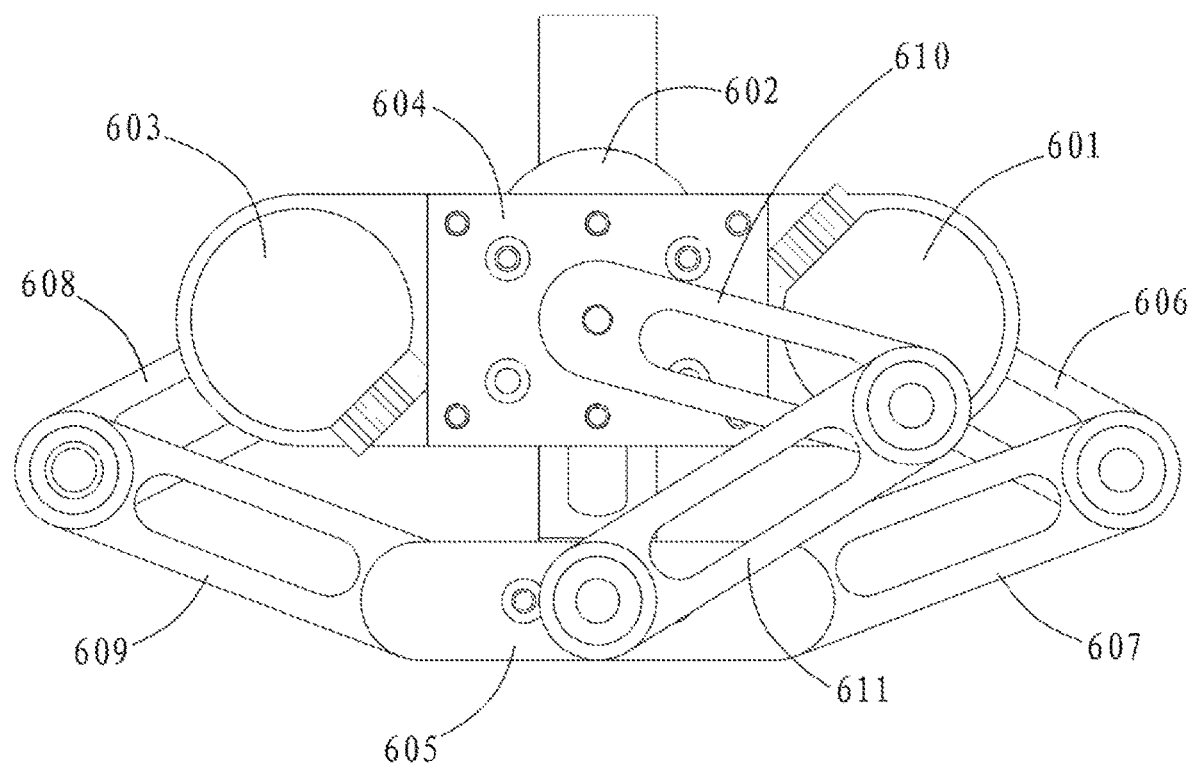
FIG. 6B is a bottom view of another embodiment of a haptic feedback device according to an embodiment of the present disclosure.

With reference to FIG. 6A and FIG. 6B, FIG. 6A is a perspective view of the feedback apparatus, and FIG. 6B is a bottom view of the feedback apparatus. In a preferred implementation, in the feedback apparatus provided in the embodiments of the present disclosure, the power unit includes at least one of a first motor 601, a second motor 602 and a third motor 603, the first motor 601 being set at a first end of a fixed platform 604, the third motor 603 being set at a second end of the fixed platform 604, the second motor 602 being set between the first end and the second end of the fixed platform 604.

In this embodiment, three motors provide control force for the three degrees of freedom respectively, thereby implementing more flexible control. In some embodiments, output shafts of the first motor 601, the second motor 602, and the third motor 603 are all located in a first plane, and the output shafts of the three motors are located in the same horizontal plane.

Further, the three motors correspond to three transmission apparatuses, and the specific structures are as follows:

An output shaft of the first motor 601 is connected to an end of a first sub-link 606, another end of the first sub-link 606 is connected to an end of a second sub-link 607 in a hinged manner, and another end of the second sub-link 607 is connected to a first end of the movable platform 605.

An output shaft of the third motor 603 is connected to an end of a third sub-link 608, another end of the third sub-link 608 is connected to an end of a fourth sub-link 609 in a hinged manner, and another end of the fourth sub-link 609 is connected to a second end of the movable platform 605.

An output shaft of the second motor 602 is connected to an end of a fifth sub-link 610, another end of the fifth sub-link 610 is connected to an end of a sixth sub-link 611 in a hinged manner, and a connection point between another end of the sixth sub-link 611 and the movable platform 605 is located between the first end and the second end.

In this embodiment, links of the three transmission apparatuses are respectively connected to three different positions of the movable platform 605. In some embodiments, the movable platform 605 is rectangular. In this case, the second sub-link 607 and the fourth sub-link 609 are respectively connected to two ends of the rectangle. The sixth sub-link 611 is connected to the center of the rectangle. Driven by the motors, the three transmission apparatuses not only can drive the movable platform 605 to move closer to or away from the fixed platform 604, but also can rotate around a normal line perpendicular to a motion plane where the links are located, thereby further improving flexibility of the movable platform 605.

In some embodiments, the second sub-link 607, the fourth sub-link 609 or the sixth sub-link 611 is connected to the movable platform 605 in a hinged manner. Further, the connection between at least one of the second sub-link 607, the fourth sub-link 609 or the sixth sub-link 611 and the movable platform 605 is a revolute pair structure of the hinged connection.

The hinged connection method provided in the embodiments of the present disclosure may be a revolute pair structure, or a combination of a revolute pair and a universal pair or a ball-and-socket pair structure. Preferably, all hinged connection methods mentioned in the embodiments of the present disclosure are revolute pair structures, but this does not constitute a limitation on the embodiments of the present disclosure.

In this embodiment, the movable platform 605 is connected to the link in a hinged manner, and the movable platform 605 can rotate relative to the connection point, so that the movable platform 605 has a higher degree of flexibility. In some embodiments, a connection point between the second sub-link 607 and the movable platform 605, a connection point between the fourth sub-link 609 and the movable platform 605, and a connection point between the sixth sub-link 611 and the movable platform 605 are located in a second plane. Since all the connection points are located in the same plane, driving force transmitted by the transmission apparatus to the movable platform 605 can drive the movable platform 605. The first plane and the second plane are different planes, and power outputted by the power unit in the first plane is transmitted through the transmission apparatus to the connection points in the second plane.

Because the motor is cylindrical, the three motors can be closely installed together. However, the linkage mechanism of the transmission apparatus needs to take up more space. In order to maintain a compact structure without occupying space among the transmission apparatuses, the following solution is adopted as shown in FIG. 6A.

The output shafts of the first motor 601 and the third motor 603 are oriented towards a first direction, the output shaft of the second motor 602 is oriented towards a second direction, and the first direction and the second direction are different directions.

In this embodiment, preferably, the first direction and the second direction are opposite directions. Because the first motor 601 and the third motor 603 are separated by the second motor 602, transmission apparatuses of the first motor 601 and the third motor 603 are installed in the same direction, and there is no interference between the links. In addition, a transmission apparatus of the second motor 602 located between the first motor 601 and the third motor 603 is installed in an opposite direction, so that the linkage structure of the transmission apparatus of the second motor 602 does not interfere with the transmission apparatus between the first motor 601 and the third motor 603.

Further, in order to implement installation directions of the foregoing motors, the fixed platform 604 for installing the motors needs to have a corresponding structure to ensure the implementation of the installation directions of the motors.

Figure 7:
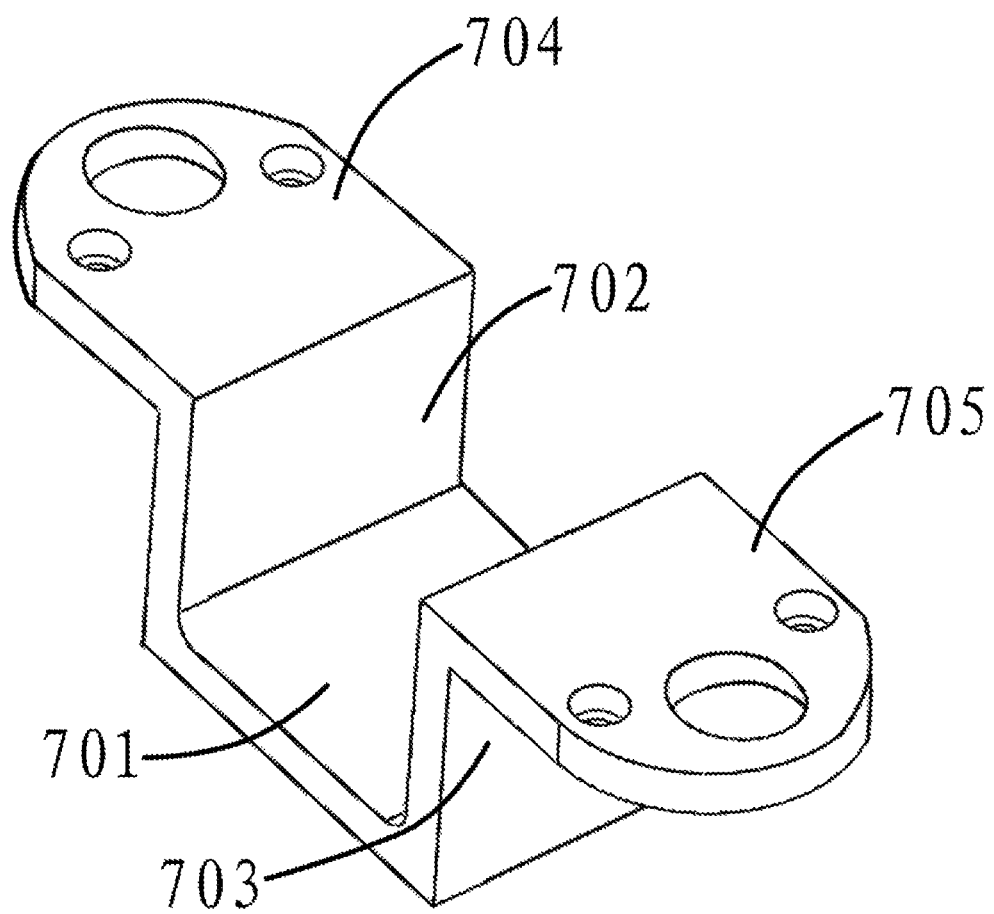
FIG. 7 is a schematic diagram of a fixed platform in an embodiment of a haptic feedback device according to an embodiment of the present disclosure.

With reference to FIG. 7, a preferred implementation of the fixed platform of the haptic feedback device in the embodiments of the present disclosure is as follows:

the fixed platform includes a bottom surface 701, a first vertical plate 702, a second vertical plate 703, a first side wing 704 and a second side wing 705 that are integrally set.

A first end of the first vertical plate 702 and a first end of the second vertical plate 703 are set at two ends of the bottom surface 701 respectively and are perpendicular to the bottom surface 701. The first side wing 704 is connected to a second end of the first vertical plate 702. The first side wing 704 is perpendicular to the first vertical plate 702. The second side wing 705 is connected to a second end of the second vertical plate 703, and the second side wing 705 is perpendicular to the second vertical plate 703.

The first motor is set on the first side wing 704, the third motor is set on the second side wing 705, and the second motor is set on the bottom surface 701.

The first motor and the third motor are installed towards direction a, and the second motor is installed towards direction b, the direction a and the direction b being opposite directions. The first motor, the second motor and the third motor are installed in a staggered manner, which makes the structure more compact.

In this embodiment, according to the foregoing structure, the fixed platform is in a "concave" shape as a whole, so that the motors can be installed on the fixed platform in a staggered and compact manner, to implement different orientations of the output shafts. As shown in FIG. 7, after the motor is installed on the fixed platform, the first sub-link connected to the first motor is oriented towards an end of the fixed platform, and the third sub-link connected to the third motor is oriented towards another end of the fixed platform. Therefore, the three sub-links connected to the three motors form a structure similar to three parallel lines, and do not interfere with each other. In addition, the structure is relatively compact and has a smaller volume, which can implement parallel connection of a plurality of feedback apparatuses.

Further, based on the fixed platform structure in FIG. 7, a specific installation method between the output shafts and the links of the transmission apparatuses is as follows.

The output shaft of the first motor passes through the first side wing 704 and is connected to the first sub-link. The output shaft of the third motor passes through the second side wing 705 and is connected to the third sub-link. The output shaft of the second motor passes through the bottom surface 701 and is connected to the fifth sub-link.

In this embodiment, the motor is installed on the fixed platform, and the output shaft of the motor passes through the fixed platform and is connected to the link, so that the fixed platform can stabilize output of the output shaft, and prevent the link from shaking during a power outputting process of the output shaft, thereby ensuring that the motor can output higher power.

The foregoing embodiments describe the haptic feedback device provided in the present disclosure in detail. The following describes, in combination with a specific working scenario, a specific moving mode of the haptic feedback device during actual usage.

Figure 8:
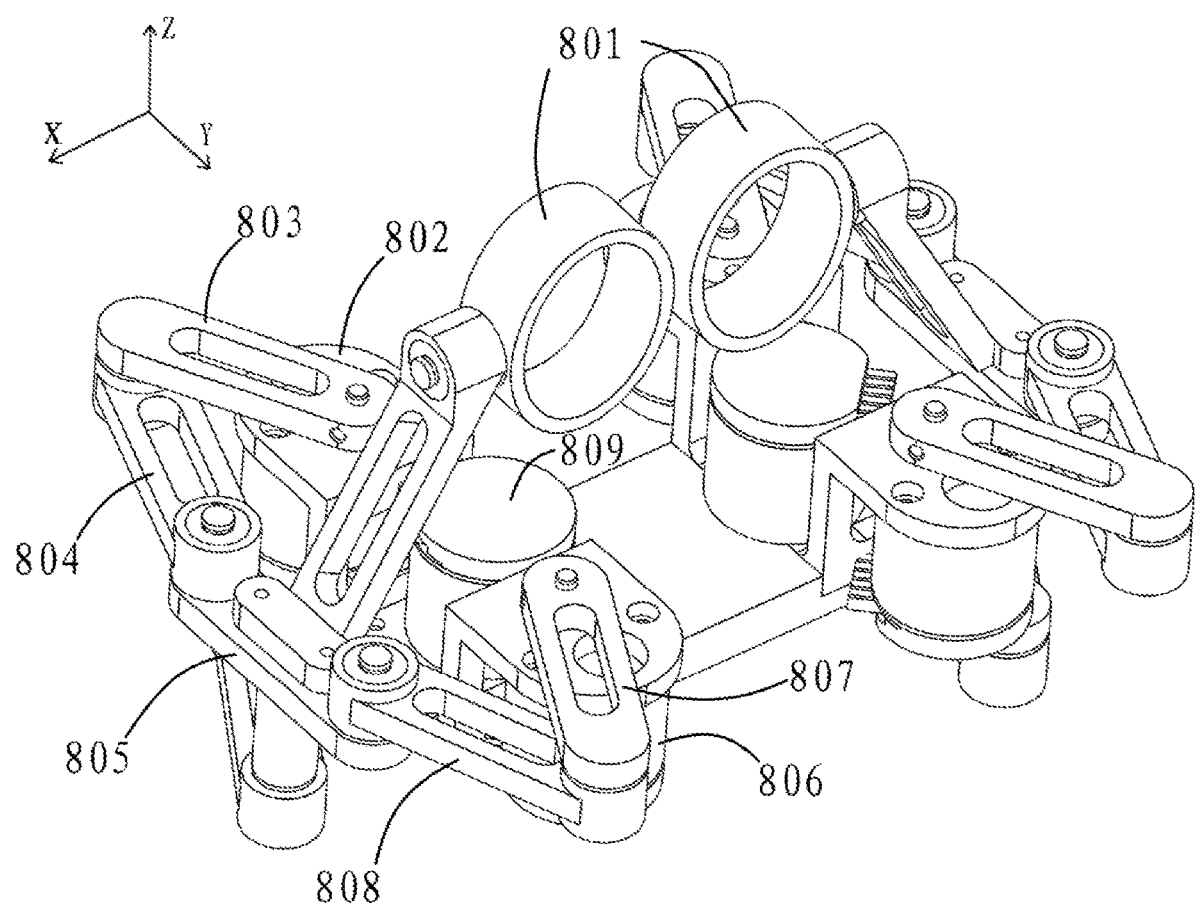
FIG. 8 is a schematic diagram of another embodiment of a haptic feedback device according to an embodiment of the present disclosure.

As shown in FIG. 8, a device provided in the embodiments of the present disclosure is preferably a haptic feedback device with two feedback apparatuses connected in parallel. The haptic feedback device can move in both an x-axis direction and a y-axis direction, and can rotate around a direction where a z-axis is located. For example, in a scenario of a VR game, a user uses the haptic feedback device shown in FIG. 8 to interact with the VR game console. The user inserts an index finger and a thumb into two rings 801 respectively to complete preparation. During the game, the user is required to pinch and rub a target object in the game to complete a game task. The user applies pressure to the rings 801 through the index finger and the thumb respectively, so as to implement a pinching/rubbing operation on the target object in the game. At this time, pressure applied by the user to the rings 801 is transmitted to a motor through a link of a transmission apparatus. The motor obtains the pressure inputted by the user and transmits the pressure to a game system. The game obtains a feedback force value in real time according to a pressure value inputted by the user and transmits the feedback force value to the motor. The motor drives the link of the transmission apparatus through an output shaft, so as to drive a movable platform 805 to move, and transmit the feedback force to the rings 801. Therefore, the user feels resistance from the rings 801. In this way, a sense of force with which the user pinches and rubs the target object in the game is simulated.

When the user wants to pinch the target object in the game, the user needs to drive the two rings 801 closer to each other. At this time, in order to provide feedback force, a first motor 802 rotates to drive a first sub-link 803 to rotate, thereby increasing an angle between the first sub-link 803 and a second sub-link 804, and driving a first end of the movable platform 805 to move away from a fixed platform. A third motor 806 rotates, and drives a third sub-link 807 to rotate, thereby increasing an angle between the third sub-link 807 and the fourth sub-link 808, and driving a second end of the driving platform 805 to move away from the fixed platform. At the same time, a second motor 809 works in the same manner to drive, through the transmission apparatus, a middle part of the movable platform 805 to move away from the fixed platform. Because three ends of the movable platform 805 are driven by force that drives the three ends away from the fixed platform, the movable platform 805 moves away from the fixed platform. The other feedback apparatus connected in parallel performs the same operation, so that the two rings 801 move away from each other under the driving of the first motor 802 and the third motor 806, thereby providing force feedback for a pinching action of the user.

When the rings 801 need to rotate around the direction where the z-axis is located, the three motors work together to provide resistance for a rotating operation. For example, when the user drives one ring 801 to rotate, the first motor 802, the second motor 809, and the third motor 806 cooperate to drive the movable platform 805 to rotate around an opposite direction, thereby providing feedback force for the user. In a specific working process, when the user performs a rubbing action through the index finger and the thumb, the two rings 801 are staggered in the y-axis direction. In addition, according to a structure of a human hand, when the two rings 801 are rubbed to move, the two rings 801 will rotate around a direction of the z-axis. At this time, the first motor 802, the third motor 806, and the second motor 809 provide moving resistance for the rings 801 in the y-axis direction, and provide rotating resistance during rotation. Therefore, through synergy of the three motors, abundant force feedback is finely provided for movement of fingers of the user, and a haptic feedback effect under actual conditions is more realistically simulated.

In summary, the haptic feedback device provided in the embodiments of the present disclosure includes: a first feedback apparatus, including: a fixed platform, a power unit, a movable platform and a ring. The power unit is set on the fixed platform, the movable platform is connected to the power unit, and the ring is set on the movable platform; the power unit drives the movable platform to move relative to the fixed platform, to control movement of the ring; when the ring is moved by external force, the power unit controls the ring to provide reaction force of the movement, so as to implement haptic feedback. During specific operation, a user inserts a finger into the ring, and the power unit drives the movable platform to move relative to the fixed platform. Therefore, the device can provide accurate force feedback to the finger of the user through the ring, achieving good rigidity and dynamic performance.

Further, the embodiments of the present disclosure further provide an electronic device, including: an interactive apparatus, an input/output (I/O) interface, a processor, and a memory, the memory storing a program instruction, the processor being configured to execute the program instruction stored in the memory. The program instruction may be a VR game interface, a remote control program, an AI program, and so on. The interactive apparatus is configured to obtain an operation instruction inputted by a user; the interactive apparatus including the haptic feedback device shown in any one of FIG. 1A to FIG. 7 above.

Figure 9:
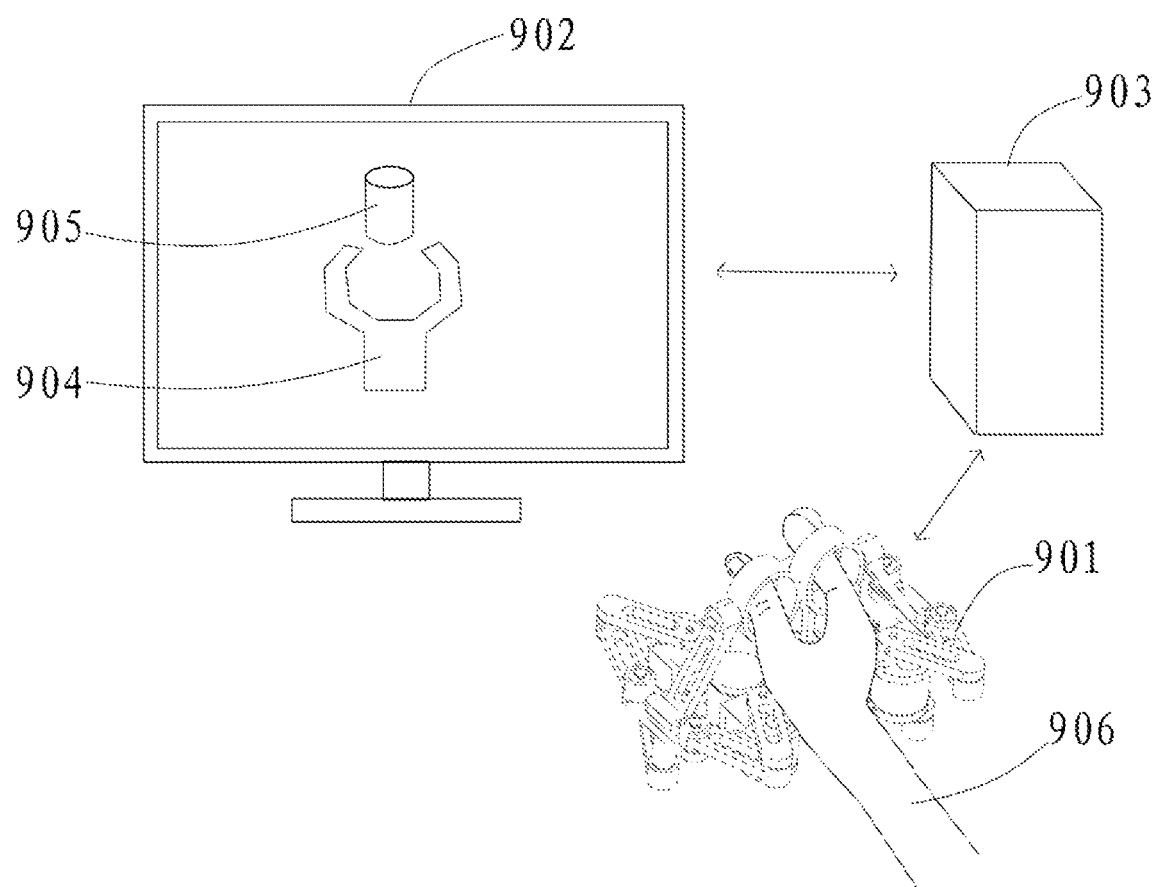
FIG. 9 is a schematic diagram of an electronic device according to an embodiment of the present disclosure.

In a preferred implementation, as shown in FIG. 9, the interactive apparatus includes a haptic feedback apparatus 901 and a display screen 902 shown in FIG. 8. The interactive apparatus 901 is connected to a host 903 through the input/output (I/O) interface, and the host 903 includes a processor and a memory.

In a specific working process, a game run in the host 903 is displayed on the display screen 902. A display picture includes a hook 904 and a target object 905. A user inserts an index finger and a thumb of a hand 906 into the haptic feedback apparatus 901. The user controls movement of the haptic feedback apparatus 901, to transmit an operation signal to the host 903, thereby controlling the hook 904 to grip the target object 905 in the display picture. The processor in the host 903 transmits a control signal to the haptic feedback apparatus 901 according to game logic. The haptic feedback apparatus 901 provides resistance for the hand 906 of the user in an operating process of the user, thereby simulating resistance generated in a process of griping the target object 905.

Further, the embodiments of the present disclosure further provide a robot system, including: an operating apparatus, a processor, an input/output (I/O) interface, a memory, and a mechanical arm. The mechanical arm and the operating apparatus are respectively connected to the memory and the processor through the input/output (I/O) interface; the operating apparatus is configured to control movement of the mechanical arm; the operating apparatus is configured to obtain an operating instruction inputted by a user, and the operating apparatus includes the haptic feedback device shown in any one of FIG. 1A to FIG. 7 above.

In this embodiment, the memory and the processor can be connected to the mechanical arm and the operating apparatus at the same time through one input/output (I/O) interface, or can be respectively connected to the mechanical arm and the operating apparatus through two interfaces. The operating apparatus includes the foregoing haptic feedback device. In a specific working process, when the ring of the haptic feedback device moves under traction of the finger of the user, the first sensor obtains a value of external force and transmits the value to the processor. The processor generates a second control signal according to the value of the external force and transmits the second control signal to the mechanical arm. The mechanical arm outputs gripping force according to the second control signal and grips a target object. In the process, the memory reads and stores related data.

In some embodiments, a second sensor is set on the mechanical arm. The second sensor obtains a value of pressure with which the mechanical arm grips the target object and transmits the value to the processor. The processor generates a first control signal according to the pressure value and transmits the first control signal to a power unit of the haptic feedback device. The power unit outputs torsion according to the first control signal, to provide feedback force on the ring. The mechanical arm is configured to grip an object. A specific structure and a working manner of the mechanical arm can be arbitrarily selected by a person skilled in the art according to their needs, which is not limited in the embodiments of the present disclosure.

In this embodiment, in the robot system, the user controls the mechanical arm to grip the target object through the haptic feedback device. At the same time, the user feels, according to the haptic feedback device, the force feedback of the mechanical arm when gripping the target object, so that a gripping operation of the mechanical arm has a sense of force presence, and the user has a feeling of directly gripping the target object.

The embodiments in this specification are all described in a progressive manner. Description of each of the embodiments focuses on differences from other embodiments, and reference may be made to each other for the same or similar parts among the embodiments. A person skilled in the art may further realize that, in combination with the embodiments herein, units of each example described can be implemented by electronic hardware, computer software, or a combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. A person skilled in the art may use different methods to implement the described functions for each particular application, but the implementation does not go beyond the scope of the present disclosure.

The foregoing description of the disclosed embodiments enables a person skilled in the art to implement or use the present disclosure. Various modifications to the embodiments are obvious to a person skilled in the art, and general principles defined in this specification may be implemented in other embodiments without departing from the spirit or scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. A haptic feedback device, comprising:
a first feedback apparatus, comprising: a fixed platform, a movable platform, a ring disposed on the movable platform, and a power unit disposed on the fixed platform and connected to the movable platform, wherein:
the power unit is configured to obtain a first control signal generated by a controller and output torsion according to the first control signal, wherein the power unit comprises a first motor, a second motor, and a third motor, the first motor, the second motor, and the third motor are disposed on the fixed platform, the second motor is disposed between the first motor and the third motor;
the movable platform is configured to be driven by the torsion to move relative to the fixed platform; and
the ring is configured to provide feedback force as the movable platform moves, to implement haptic feedback.

2. The device according to claim 1, further comprising:
a first sensor disposed on an inner side of the ring, and configured to sense external force, obtain a value of the external force and transmit the value to the controller, wherein the first control signal is generated according to the value of the external force.

3. The device according to claim 2, wherein the controller is connected to a gripping apparatus, the gripping apparatus comprises two hooks connected in a hinged manner, a second sensor is set on an inner side of at least one of the hooks, and the second sensor is configured to obtain a pressure value during a gripping process of the gripping apparatus;
  the controller is configured to generate a second control signal according to the value of the external force obtained by the first sensor, and the second control signal is configured to control gripping force of the gripping apparatus; and
  the controller is further configured to generate the first control signal according to the pressure value obtained by the second sensor.

4. The device according to claim 1, further comprising a second feedback apparatus and a connecting piece, wherein the fixed platform of the first feedback apparatus is connected to the connecting piece, the second feedback apparatus has the same structure as the first feedback apparatus, and a fixed platform of the second feedback apparatus is connected to the connecting piece.

5. The device according to claim 4, wherein the first feedback apparatus and the second feedback apparatus are symmetrically set at two ends of the connecting piece.

6. The device according to claim 1, wherein the first feedback apparatus further comprises a transmission apparatus, and the movable platform and the power unit are connected through the transmission apparatus.

7. The device according to claim 6, wherein the transmission apparatus comprises a first link and a second link, the first link being connected to a power output terminal of the power unit, the second link being connected to the movable platform, the first link being connected to the second link in a hinged manner; the power unit drives the movable platform through the first link and the second link.

8. The device according to claim 1, wherein the movable platform and the ring are connected through a third link, a first end of the third link being fixedly connected to the movable platform, a second end of the third link being connected to the ring through a rotating shaft, and the ring is rotatable around the rotating shaft.

9. The device according to claim 1, wherein
  an output shaft of the first motor is connected to a first end of a first sub-link, a second end of the first sub-link is connected to a first end of a second sub-link in a hinged manner, and a second end of the second sub-link is connected to a first end of the movable platform;
  an output shaft of the third motor is connected to a first end of a third sub-link, a second end of the third sub-link is connected to a first end of a fourth sub-link in a hinged manner, and a second end of the fourth sub-link is connected to a second end of the movable platform;
  an output shaft of the second motor is connected to a first end of a fifth sub-link, a second end of the fifth sub-link is connected to a first end of a sixth sub-link in a hinged manner, and a connection point between a second end of the sixth sub-link and the movable platform is located between the first end and the second end of the movable platform; and
  at least one of the second sub-link, the fourth sub-link or the sixth sub-link is connected to the movable platform in a hinged manner.

10. The device according to claim 1, wherein the output shafts of the first motor and the third motor are oriented towards a first direction, the output shaft of the second motor is oriented towards a second direction, and the first direction and the second direction are different directions.

11. The device according to claim 1, wherein the fixed platform comprises a bottom surface, a first vertical plate, a second vertical plate, a first side wing and a second side wing that are set integrally;
  a first end of the first vertical plate and a first end of the second vertical plate are disposed at two ends of the bottom surface respectively and are perpendicular to the bottom surface;
  the first side wing is connected to a second end of the first vertical plate, and is perpendicular to the first vertical plate;
  the second side wing is connected to the second end of the second vertical plate, and is perpendicular to the second vertical plate; and
  the first motor is set on the first side wing, the third motor is set on the second side wing, and the second motor is set on the bottom surface.

12. The device according to claim 11, wherein the output shaft of the first motor passes through the first side wing and is connected to the first sub-link; the output shaft of the third motor passes through the second side wing and is connected to the third sub-link; the output shaft of the second motor passes through the bottom surface and is connected to the fifth sub-link.

13. The device according to claim 1, wherein the output shaft of the first motor, the output shaft of the second motor and the output shaft of the third motor are all located on a first plane; a connection point between the second sub-link and the movable platform, a connection point between the fourth sub-link and the movable platform, and a connection point between the sixth sub-link and the movable platform are located on a second plane;
  the first plane and the second plane being different planes.

14. An electronic device, comprising: an interactive apparatus, an input/output (I/O) interface, a processor, and a memory, the memory storing a program instruction, the processor being configured to execute the program instruction stored in the memory;
  the interactive apparatus being configured to obtain an operation instruction inputted by a user; the interactive apparatus comprising a haptic feedback device, the haptic feedback device comprising:
  a first feedback apparatus, comprising: a fixed platform, a movable platform, a ring disposed on the movable platform, and a power unit disposed on the fixed platform and connected to the movable platform, wherein:
  the power unit is configured to obtain a first control signal generated by the processor and output torsion according to the first control signal, wherein the power unit comprises a first motor, a second motor, and a third motor, the first motor, the second motor, and the third motor are disposed on the fixed platform, the second motor is disposed between the first motor and the third motor;
  the movable platform is configured to be driven by the torsion to move relative to the fixed platform; and
  the ring is configured to provide feedback force as the movable platform moves, to implement haptic feedback.

15. The device according to claim 14, wherein the haptic feedback device further comprises:
  a first sensor disposed on an inner side of the ring, and configured to sense external force, obtain a value of the external force and transmit the value to the processor, wherein the processor is configured to generate the first control signal according to the value of the external force.

16. The device according to claim 14, wherein the haptic feedback device further comprises: a second feedback apparatus and a connecting piece, wherein the fixed platform of the first feedback apparatus is connected to the connecting piece, the second feedback apparatus has the same structure as the first feedback apparatus, and a fixed platform of the second feedback apparatus is connected to the connecting piece.

17. A robot system, comprising: an operating apparatus, a processor, an input/output (I/O) interface, a memory, and a mechanical arm, the mechanical arm and the operating apparatus being respectively connected to the memory and the processor through the input/output (I/O) interface, the operating apparatus being configured to control movement of the mechanical arm; and the operating apparatus being configured to obtain an operation instruction inputted by a user, the operating apparatus comprising a haptic feedback device, the haptic feedback device comprising:

a first feedback apparatus, comprising: a fixed platform, a movable platform, a ring disposed on the movable platform, and a power unit disposed on the fixed platform and connected to the movable platform, wherein:

the power unit is configured to obtain a first control signal generated by the processor and output torsion according to the first control signal, wherein the power unit comprises a first motor, a second motor, and a third motor, the first motor, the second motor, and the third motor are disposed on the fixed platform, the second motor is disposed between the first motor and the third motor;

the movable platform is configured to be driven by the torsion to move relative to the fixed platform; and the ring is configured to provide feedback force as the movable platform moves, to implement haptic feedback.

18. The system according to claim 17, wherein the haptic feedback device further comprises:

a first sensor disposed on an inner side of the ring, and configured to sense external force, obtain a value of the external force and transmit the value to the processor, wherein the processor is configured to generate the first control signal according to the value of the external force.

19. The system according to claim 18, wherein the mechanical arm comprises two hooks connected in a hinged manner, a second sensor is set on an inner side of at least one of the hooks, and the second sensor is configured to obtain a pressure value during a gripping process of the mechanical arm;

the processor is configured to generate a second control signal according to the value of the external force obtained by the first sensor, and the second control signal is configured to control gripping force of the mechanical arm; and the processor is further configured to generate the first control signal according to the pressure value obtained by the second sensor.

* * * * *